United States Patent
Nishida

(10) Patent No.: US 12,532,250 B2
(45) Date of Patent: Jan. 20, 2026

(54) PROXIMATE POSITIONING FOR WIRELESS CONNECTION OF AN ELECTRONIC DEVICE

(71) Applicant: SEIKO EPSON CORPORATION, Tokyo (JP)

(72) Inventor: Kota Nishida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 18/190,325

(22) Filed: Mar. 27, 2023

(65) Prior Publication Data

US 2023/0308997 A1 Sep. 28, 2023

(30) Foreign Application Priority Data

Mar. 28, 2022 (JP) .................................. 2022-051056

(51) Int. Cl.
| | |
|---|---|
| *H04W 48/16* | (2009.01) |
| *G01S 1/08* | (2006.01) |
| *G01S 3/14* | (2006.01) |
| *G01S 3/48* | (2006.01) |
| *G01S 5/02* | (2010.01) |
| *H04W 76/10* | (2018.01) |

(52) U.S. Cl.
CPC ............... *H04W 48/16* (2013.01); *G01S 1/08* (2013.01); *G01S 3/14* (2013.01)

(58) Field of Classification Search
CPC ......... H04W 48/16; H04W 76/10; G01S 1/08; G01S 3/14; G01S 3/48; G01S 5/0284
See application file for complete search history.

(56) References Cited

U.S. PATENT DOCUMENTS

| | | | |
|---|---|---|---|
| 2019/0306713 A1 | 10/2019 | Yanagisawa et al. | |
| 2021/0219361 A1 | 7/2021 | Hada | |
| 2021/0312477 A1* | 10/2021 | Kanda | H04W 4/80 |
| 2021/0385623 A1* | 12/2021 | Wang | H04W 4/029 |
| 2022/0190904 A1* | 6/2022 | Wang | H04B 7/088 |
| 2022/0322085 A1* | 10/2022 | De Vegt | G07C 9/00309 |
| 2023/0129726 A1* | 4/2023 | Narula | G01S 13/4454 |
| | | | 342/458 |
| 2023/0189372 A1* | 6/2023 | Shinozuka | G06F 3/1204 |
| | | | 370/329 |

FOREIGN PATENT DOCUMENTS

| | | |
|---|---|---|
| JP | 2019-176451 A | 10/2019 |
| JP | 2020197419 | 12/2020 |
| JP | 2020197869 | 12/2020 |
| JP | 2021111962 | 11/2024 |

\* cited by examiner

*Primary Examiner* — Harry H Kim
(74) *Attorney, Agent, or Firm* — WORKMAN NYDEGGER

(57) ABSTRACT

An electronic device wirelessly communicates with a terminal device by a wireless communicator, and includes a direction information acquisition unit and a processor. The direction information acquisition unit acquires, based on a beacon signal received by the wireless communicator from the terminal device, direction information related to a direction of the terminal device with respect to a reference position of the electronic device. The processor performs wireless connection of wirelessly connecting to the terminal device when the processor determines that, based on the direction information, the terminal device is positioned in a predetermined direction range.

10 Claims, 8 Drawing Sheets

PROXIMATE POSITIONING FOR WIRELESS CONNECTION OF AN ELECTRONIC DEVICE

The present application is based on, and claims priority from JP Application Serial Number 2022-051056, filed Mar. 28, 2022, the disclosure of which is hereby incorporated by reference herein in its entirety.

BACKGROUND

1. Technical Field

The present disclosure relates to an electronic device, a processing method, and a program.

2. Related Art

In the related art, a method for assisting a user in wireless communication setting of an electronic device is known. JP-A-2019-176451 discloses a method for displaying, on a terminal device, a screen for setting a first wireless communication method with an electronic device using wireless communication in a second wireless communication method.

However, JP-A-2019-176451 does not disclose a method for using direction information related to a direction of the terminal device to appropriately specify a terminal device to be connected to the electronic device by the first wireless communication method, among terminal devices connected by wireless communication in the second wireless communication method.

SUMMARY

An aspect of the present disclosure relates to an electronic device for wirelessly communicating with a terminal device by a wireless communication unit. The electronic device includes: a direction information acquisition unit configured to acquire, based on a beacon signal received by the wireless communication unit from the terminal device, direction information related to a direction of the terminal device with respect to a reference position of the electronic device; and a processing unit configured to perform wireless connection of wirelessly connecting to the terminal device when the processing unit determines that, based on the direction information, the terminal device is positioned in a predetermined direction range.

An aspect of the present disclosure relates to a processing method including: performing wireless communication of wirelessly communicating with a terminal device; performing processing of acquiring, based on a beacon signal received by the wireless communication, direction information related to a direction of the terminal device with respect to a reference position of an electronic device; and performing wireless connection of wirelessly connecting to the terminal device when a determination is made that, based on the direction information, the terminal device is positioned in a predetermined direction range.

An aspect of the present disclosure relates to a non-transitory computer-readable storage medium storing a program. The program includes: causing a computer to function as a wireless communication unit configured to wirelessly communicate with a terminal device, a direction information acquisition unit configured to acquire, based on a beacon signal received by the wireless communication unit from the terminal device, direction information related to a direction of the terminal device with respect to a reference position of an electronic device, and a processing unit configured to perform wireless connection of wirelessly connecting to the terminal device when the processing unit determines that, based on the direction information, the terminal device is positioned in a predetermined direction range.

DESCRIPTION OF EXEMPLARY EMBODIMENTS

Hereinafter, an embodiment will be described. The embodiment described below does not unduly limit contents of the present disclosure described in the claims. All configurations described in the embodiment are not necessarily essential constituent elements of the present disclosure.

Figure 1:
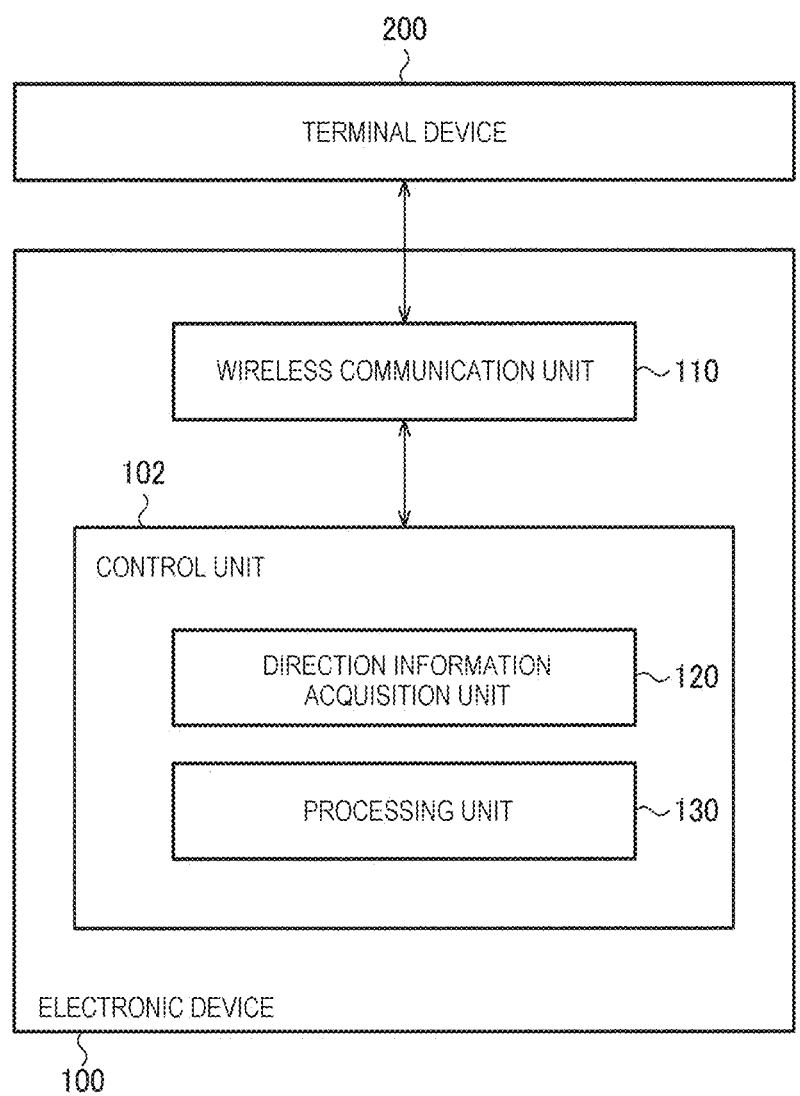
FIG. 1 is a block diagram showing a configuration example of an electronic device.

FIG. 1 is a block diagram showing a configuration example of a system including an electronic device 100 and a terminal device 200 according to the embodiment. The electronic device 100 includes a wireless communication unit 110 and a control unit 102. The electronic device 100 performs wireless communication with the terminal device 200 by the wireless communication unit 110. The electronic device 100 according to the embodiment is not limited to the configuration in FIG. 1, and various modifications can be made, such as omitting some of the constituent elements or adding other constituent elements. The other constituent elements are, for example, a display unit or a memory. Although not shown in FIG. 1, the electronic device 100 may further include an operation unit 140. The operation unit 140 may be hardware integrated with a display unit (not shown) by a touch panel, for example.

The electronic device 100 according to the embodiment is, for example, a printer, but may be a scanner, a personal computer, a wearable device, a biological information measurement device, a robot, a video device, a physical quantity measurement device, or the like. The wearable device refers to a smartwatch, an activity tracker, or the like. The biological information measurement device refers to a pulsimeter, a pedometer, or the like. The video device refers to a camera, a projector, or the like. The physical quantity measurement device refers to a thermometer, a scale, or the like. The printer here includes a multifunction peripheral. The multifunction peripheral refers to a printer having a function other than a printer function. The function other than the printer function is a copy function, a facsimile function, a scanner function, or the like, but may be another function. The terminal device 200 is, for example, a portable information terminal such as a smartphone, but may be the above-described personal computer, or the like. A configuration example of a system including the electronic device 100 and the terminal device 200 according to the embodiment is not limited to FIG. 1. For example, the electronic device 100 may wirelessly communicate with a plurality of terminal devices 200, or the terminal device 200 may wirelessly communicate with a plurality of electronic devices 100. The electronic device 100 according to the embodiment can also wirelessly communicate with an external device different from the terminal device 200 in FIG. 1.

The wireless communication unit 110 is a communication interface for performing wireless communication according to a predetermined wireless communication standard. The wireless communication unit 110 can be implemented with, for example, hardware for communication such as an application specific integrated circuit (ASIC) for communication or a processor for communication, or firmware for communication. In the embodiment, a processing unit 130, which will be described later, performs communication control such as information transmission and information reception on the wireless communication unit 110, so that the wireless communication unit 110 can transmit information to an external device of the electronic device 100 or the like or receive information from the external device. There may be a plurality of types of predetermined wireless communication standards. That is, the wireless communication unit 110 includes hardware, firmware for communication, and the like corresponding to a desired wireless communication standard.

The wireless communication unit 110 can perform wireless communication according to a short-range wireless communication standard such as Bluetooth (registered trademark) as the predetermined wireless communication standard. In the embodiment, Bluetooth includes Bluetooth Low Energy (BLE), and may be simply referred to as BLE in the following description. In the embodiment, for example, when a connection application for assisting wireless connection with the electronic device 100 is installed in the terminal device 200 and an application program of the connection application is started, a beacon signal conforming to the BLE standard is automatically broadcast from the terminal device 200. The wireless communication unit 110 performs an active scan or passive scan to recognize the terminal device 200 which advertises the beacon signal. It is assumed that software corresponding to the connection application is incorporated in the electronic device 100 of the embodiment in advance. In the following description and drawings, an application may be referred to as an APP.

The wireless communication unit 110 may perform wireless communication according to another wireless communication standard. The other wireless communication standard is, for example, wireless communication by Wi-Fi (registered trademark), and the wireless communication unit 110 may further perform wireless communication in a predetermined connection mode of Wi-Fi. The predetermined connection mode is, for example, the infrastructure mode or the ad hoc mode by the Wi-Fi, or the Wi-Fi Direct (registered trademark) mode, but may be another connection mode. The Wi-Fi Direct can also be referred to as direct connection. Each predetermined connection mode can be freely set to be valid or invalid. When the application program of the connection application of the wireless connection is started, a beacon signal conforming to the Wi-Fi standard may be automatically broadcast from the terminal device 200. Similarly, the wireless communication unit 110 may perform an active scan or passive scan to recognize the terminal device 200 which advertises the beacon signal conforming to the Wi-Fi standard.

The control unit 102 performs data input and output control from and to each functional unit including the above-described wireless communication unit 110. For example, the control unit 102 executes various types of arithmetic processing based on a predetermined program read from a memory (not shown), an operation input signal from the operation unit 140, or various types of data received via the wireless communication unit 110, and controls an operation of display outputting to a display unit (not shown), for example. The predetermined program is, for example, basic software such as an operating system (OS), various application programs operating based on the basic software, or both of the basic software and the various application programs.

The control unit 102 can be implemented with a processor. That is, each processing according to the embodiment can be implemented with a processor which operates based on information such as a program, and a memory (not shown) which stores the information such as a program. The processor may be, for example, individual hardware which implements functions of respective units, or may be integrated hardware which implements the functions of the respective units. For example, the processor may include hardware. The hardware may include at least one of a circuit for processing a digital signal or a circuit for processing an analog signal. For example, the processor may include one or more circuit devices or one or more circuit elements mounted on a circuit board. The processor may be, for example, a central processing unit (CPU). The processor is not limited to a CPU, and various processors such as a graphics processing unit (GPU) or a digital signal processor (DSP) can be used. The processor may be a hardware circuit using ASIC. The processor may include an amplifier circuit, a filter circuit, or the like which processes analog signals.

The control unit 102 according to the embodiment includes a direction information acquisition unit 120 and the processing unit 130. That is, the electronic device 100 according to the embodiment includes the direction information acquisition unit 120 and the processing unit 130. For example, the control unit 102 implements functions of the direction information acquisition unit 120 and the processing unit 130 by reading software corresponding to the above-described connection application of the wireless connection from a memory (not shown) and executing the software. When basic software serving as a base is further required in an operation of the software corresponding to the connection application, the control unit 102 may read a program of the basic software from the memory (not shown) so that the function of, for example, the processing unit 130 can be implemented.

The direction information acquisition unit 120 acquires direction information related to a direction of the terminal device 200 with respect to a reference position of the electronic device 100 through wireless communication with the terminal device 200 by the wireless communication unit 110. For example, it is assumed that a predetermined device which inhibits the wireless communication is positioned around the electronic device 100, and the predetermined device is normally in operation. When the wireless communication unit 110 can receive a wireless communication radio wave for a predetermined time or longer, the processing unit 130 transmits, to the direction information acquisition unit 120, information indicating that the terminal device 200 or the like is positioned in a predetermined direction range which is not affected by the predetermined device and the wireless communication radio wave is received from the terminal device 200. In this case, it is not necessary to establish wireless communication connection according to a wireless communication standard for the wireless communication radio wave. The predetermined device which inhibits the wireless communication is, for example, a device which uses radio waves in a 2.4 GHz band. The direction information acquisition unit 120 may use a BLE direction detection function, which will be described later, to obtain direction information.

The processing unit 130 functions as a program of the wireless connection described above, and performs processing described later with reference to FIG. 4 and the like. For example, when the processing unit 130 determines that the terminal device 200 is positioned in the above-described predetermined direction range, the processing unit 130 performs wireless connection with the terminal device 200 corresponding to terminal identification information in the beacon signal of the wireless communication radio wave. The terminal identification information is, for example, a MAC address of the terminal device 200 stored in a payload of a protocol data unit in an advertising packet of the beacon signal, but may be other information such as a serial number if the information is interconvertible with the MAC address. For example, at a timing at which the above-described direction information acquisition unit 120 acquires the direction information by using an advertising packet of BLE broadcasted by a BLE communication unit 212 of the terminal device 200, the processing unit 130 acquires the terminal identification information based on the advertising packet. The processing unit 130 may function as basic software or the like serving as a base of the program of the wireless connection. A function of the basic software or the like is, for example, a function of converting orientation information acquired based on a geomagnetic sensor or a gyro sensor (not shown) into information used in each processing in the program of the wireless connection. In the embodiment, the advertising packet of BLE may further include other information. The other information is, for example, information on an intensity of the radio wave, but may be, for example, information indicating that a connection application is installed, and the details thereof will be described later each time.

The processing unit 130 performs wireless connection with respect to the terminal device 200 at a timing at which the direction information acquisition unit 120 acquires information indicating that the terminal device 200 is positioned in the predetermined direction range. For example, as described above, when the wireless communication radio wave has been continuously received from the terminal device 200 for a predetermined time or longer, a user possessing the terminal device 200 intentionally avoids a position at which the wireless communication is inhibited, and thus it is considered that the terminal device 200 is positioned at a position based on an intention to establish wireless communication connection with the electronic device 100. Therefore, the processing unit 130 performs, for example, BLE pairing and connection setting in various modes of Wi-Fi as the wireless connection according to the above-described predetermined wireless communication standard with respect to the terminal device 200. Various modes of Wi-Fi will be described later. For example, the processing unit 130 may perform connection setting in various connection modes of Wi-Fi while using the BLE direction detection function or the like, and details thereof will be described later.

Thus, the electronic device 100 according to the embodiment is an electronic device 100 for wirelessly communicating with the terminal device 200 by the wireless communication unit 110, and includes the direction information acquisition unit 120 and the processing unit 130. The direction information acquisition unit 120 acquires, based on the beacon signal received by the wireless communication unit 110 from the terminal device 200, direction information related to the direction of the terminal device 200 with respect to the reference position of the electronic device 100. The processing unit 130 performs wireless connection of wirelessly connecting to the terminal device 200 when the processing unit 130 determines that, based on the direction information, the terminal device 200 is positioned in the predetermined direction range. Thus, the electronic device 100 according to the embodiment includes the wireless communication unit 110 and the direction information acquisition unit 120, and thus can acquire the direction information based on the beacon signal broadcasted by the terminal device 200. The electronic device 100 according to the embodiment includes the processing unit 130, and thus can perform the wireless connection when the terminal device 200 is positioned in the predetermined direction range. Accordingly, the electronic device 100 can appropriately specify the terminal device 200 to be wirelessly connected to.

The electronic device 100 which performs the wireless connection when the processing unit 130 determines that the terminal device 200 is positioned in the predetermined direction range based on the direction information is not yet proposed. For example, when the wireless connection is always performed with the terminal device 200 based on reception of the wireless communication radio wave from the terminal device 200, the wireless connection may be performed with the terminal device 200 not appropriate for the connection. The terminal device 200 not appropriate for the connection is, for example, a terminal device 200 positioned in a direction in which there is a device which inhibits the wireless communication described above and for which transmission and reception of the wireless communication radio wave is not stable. Performing the wireless connection with the terminal device 200 is not desired by the user of the terminal device 200 in the first place, and unrequired connection error may occur between the electronic device 100 and the terminal device 200. Accordingly, convenience of the electronic device 100 and the terminal device 200 may be reduced. In this regard, by applying a method according to the embodiment, the terminal device 200 of the user who desires connection to the electronic device 100 is appropriately specified, and the electronic device 100 performs the wireless connection with the terminal device 200, so that it is possible to improve the convenience of the electronic device 100.

The method according to the embodiment may be implemented as a processing method. That is, the processing method according to the embodiment includes: performing wireless communication of wirelessly communicating with the terminal device 200; performing processing of acquiring, based on a beacon signal received by the wireless communication, direction information related to the direction of the terminal device 200 with respect to the reference position of the electronic device 100; and performing wireless connection of wirelessly connecting to the terminal device 200 when a determination is made that, based on the direction information, the terminal device 200 is positioned in the predetermined direction range. In this way, a similar effect as above can be obtained.

The method according to the embodiment may be implemented as a program. That is, the program according to the embodiment causes a computer to function as the wireless communication unit 110 which wirelessly communicates with the terminal device 200, the direction information acquisition unit 120, and the processing unit 130. The direction information acquisition unit 120 acquires, based on the beacon signal received by the wireless communication unit 110 from the terminal device 200, direction information related to the direction of the terminal device 200 with respect to the reference position of the electronic device 100. The processing unit 130 performs wireless connection of wirelessly connecting to the terminal device 200 when the processing unit 130 determines that, based on the direction information, the terminal device 200 is positioned in the predetermined direction range. In this way, a similar effect as above can be obtained.

The method according to the embodiment is not limited to the above, and various modifications can be made. For example, the electronic device 100 and the terminal device 200 according to the embodiment may be configured as in a configuration example of FIG. 2. That is, the wireless communication unit 110 of the electronic device 100 includes a BLE communication unit 112, an infrastructure mode communication unit 114, and an internal access point 116. In the following description and drawings, an access point may be referred to as AP. The terminal device 200 includes the BLE communication unit 212 and a Wi-Fi communication unit 214. That is, by performing pairing between the BLE communication unit 112 of the electronic device 100 and the BLE communication unit 212 of the terminal device 200, data can be transmitted and received between the electronic device 100 and the terminal device 200 using BLE.

The infrastructure mode communication unit 114 of the electronic device 100 can communicate with the Wi-Fi communication unit 214 of the terminal device 200 in the Wi-Fi infrastructure mode via an external access point 300. In the following description, the Wi-Fi infrastructure mode is simply referred to as the infrastructure mode. For example, the external access point 300 periodically broadcasts radio waves for wireless communication of a beacon or the like so that identification information of the external access point 300 can be decoded, and establishes connection in the infrastructure mode by a method described later. The identification information of the external access point 300 is, for example, a service set identifier (SSID). In the following description, "wireless communication connection according to the wireless communication standard" is simply referred to as "connection" as appropriate. The access point may also be referred to as a router. When communication in the infrastructure mode is established, connection with the external access point 300 is automatically performed when the communication is once disconnected.

The internal access point 116 of the electronic device 100 and the Wi-Fi communication unit 214 of the terminal device 200 can also perform communication in the direct connection mode. That is, the electronic device 100 is a group owner with the terminal device 200 as a client, and the internal access point 116 functions as a software access point. For example, after being activated, the internal access point 116 periodically broadcasts radio waves for wireless communication of a beacon or the like conforming to the direct connection standard. An advertising packet of a radio wave for the wireless communication includes information such as SSID which is identification information of the internal access point 116. The Wi-Fi communication unit 214 executes a scan for receiving the radio wave for the wireless communication broadcasted from the internal access point 116. Here, the scan is a passive scan, but may be an active scan. The Wi-Fi communication unit 214 makes a connection request to the internal access point 116. A signal related to the connection request includes information such as a password corresponding to the SSID of the internal access point 116. This enables wireless communication in the direct connection mode between the Wi-Fi communication unit 214 and the internal access point 116. After the wireless communication by direct connection is established and the wireless communication is once disconnected, the user may be required to set connection again because an encryption key is changed or the like. The above description does not prevent the predetermined connection mode from further including other wireless connection modes such as the ad hoc mode, a connection mode by wired communication, and the like.

Figure 2:
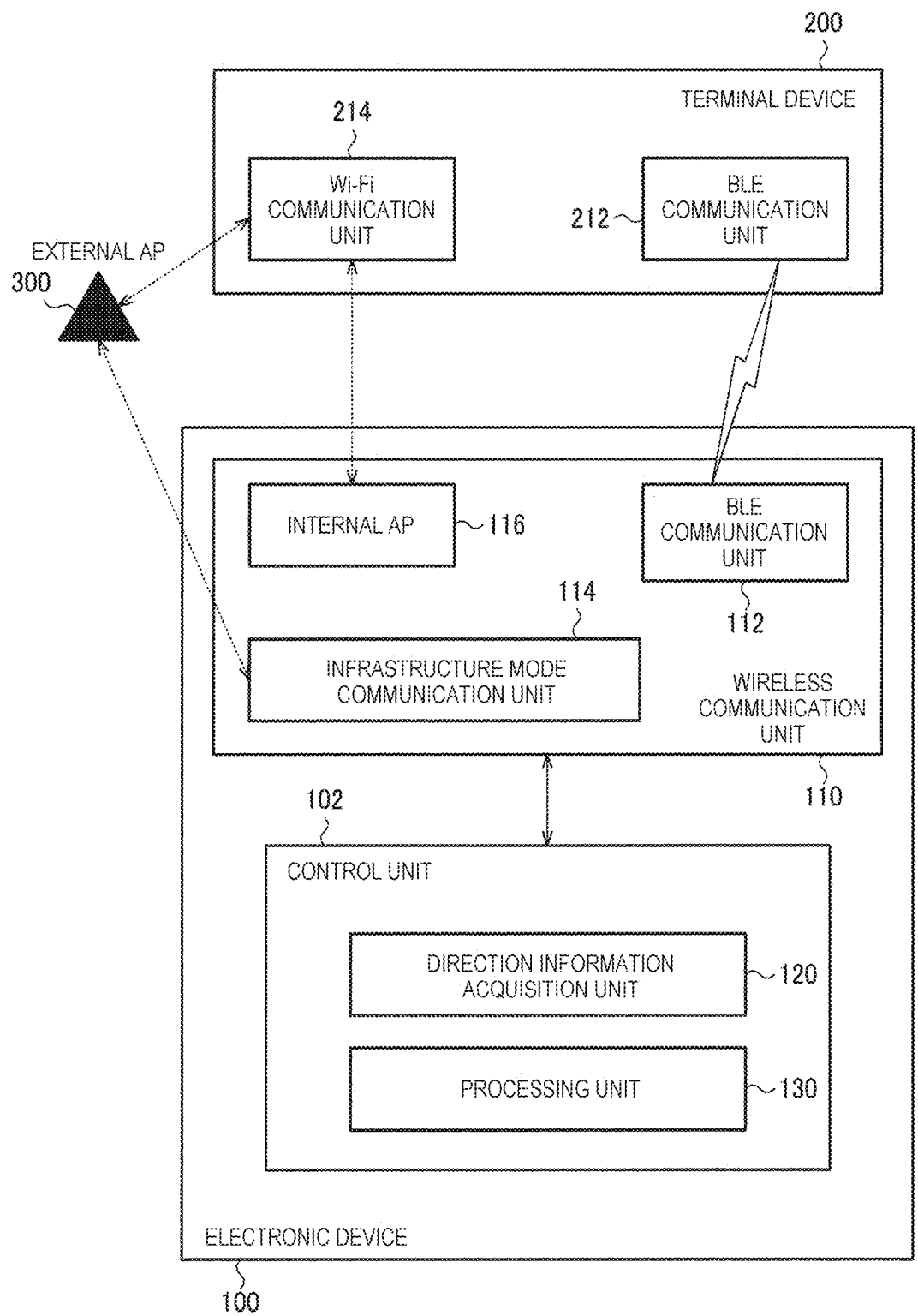
FIG. 2 is a block diagram showing a more detailed configuration example of the electronic device.

As described above, in the electronic device 100 according to the embodiment, the first wireless communication is wireless communication conforming to the Bluetooth standard, and the second wireless communication is wireless communication conforming to the Wi-Fi standard. In this way, it is possible to construct a wireless communication connection system conforming to the Wi-Fi standard by using wireless communication conforming to the Bluetooth standard. FIG. 2 is an example, and does not prevent the first wireless communication from being wireless communication conforming to a standard other than the Bluetooth standard, and does not prevent the second wireless communication from being wireless communication conforming to a standard other than the Wi-Fi standard.

The BLE communication unit 112 and the BLE communication unit 212 according to the embodiment may be compatible with the standard of Bluetooth 5.1 or later versions. In other words, each unit in the electronic device 100 and the terminal device 200 according to the embodiment may be compliant with the standard of Bluetooth 5.1 or later versions. Accordingly, the direction information acquisition unit 120 can acquire the direction information based on the direction detection function compatible with Bluetooth 5.1 or later versions.

Acquisition of the direction information based on the BLE direction detection function can be implemented by, for example, the following method. For example, as described above, it is assumed that the BLE communication unit 212 of the terminal device 200 broadcasts an advertising packet of BLE, and the BLE communication unit 112 of the wireless communication unit 110 which receives the advertising packet includes a plurality of receiving antennas. At this time, since the advertising packet reaches each of the receiving antennas with a time difference, it is possible to estimate an angle of arrival (AOA) of a radio wave based on a first calculation method using a distance between the antennas and a wavelength of the radio wave, which are already understood. That is, although not shown, the reference position of the electronic device 100 is, for example, a position where the antenna of the BLE communication unit 112 is positioned. The reference position can be positioned anywhere on the electronic device 100. A method for estimating the angle of arrival AOA including the first calculation method is known, and the detailed description thereof is omitted.

The direction information may be acquired by, for example, the following method. The BLE communication unit 212 of the terminal device 200 includes a plurality of transmitting antennas, and broadcasts an advertising packet of BLE while shifting a timing of transmitting a radio wave from each transmitting antenna. At this time, it is assumed that the advertising packet includes information on a timing at which each transmitting antenna transmits the advertising packet and distance information between the transmitting antennas. The BLE communication unit 112 of the wireless communication unit 110 can estimate an angle of departure (AOD) of the radio wave based on a second calculation method using a phase difference of advertising packets received from each transmitting antenna, information on a transmission timing in the advertising packet, and information between the transmitting antennas. A method for estimating the angle of departure AOD including the second calculation method here is known, and the detailed description thereof is omitted.

As described above, in the electronic device 100 according to the embodiment, the beacon signal based on which the direction information acquisition unit 120 acquires the direction information conforms to the Bluetooth standard. In this way, the direction information acquisition unit 120 can acquire direction information based on a Bluetooth direction detection function.

Figure 3:
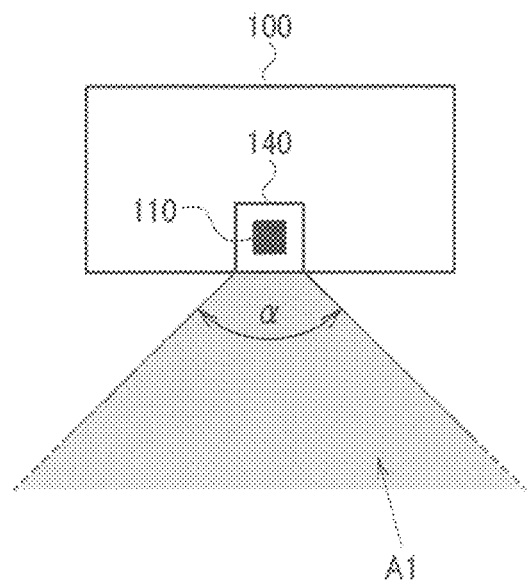
FIG. 3 is a diagram showing a predetermined direction range.

For example, the reference position may be a position which can be checked from an outside of the electronic device 100. Specifically, for example, hardware for wireless communication functioning as the wireless communication unit 110 may be disposed, through a mounting process, on a substrate including a touch panel, an operation button, and the like functioning as the operation unit 140 of the electronic device 100. Accordingly, a position of the wireless communication unit 110 and a position of the operation unit 140 are the same, and the user can grasp the position of the wireless communication unit 110 from the outside of the electronic device 100. The operation unit 140 may be provided in a front direction of the electronic device 100. The front direction of the electronic device 100 is a direction from the electronic device 100 toward a position where the user is normally assumed to be positioned when the user uses the electronic device 100. That is, as shown in A1 of FIG. 3, a direction range of a predetermined angle α including the above-described front direction may be set as the predetermined direction range with reference to an antenna (not shown) in the BLE communication unit 112 of the wireless communication unit 110. The predetermined angle α can be appropriately set by an administrator, a user, or the like of the electronic device 100. As described above, in the electronic device 100 according to the embodiment, the reference position is the position of the operation unit 140, and the predetermined direction range is a range including a front direction from the operation unit 140. In this way, the processing unit 130 can perform the wireless connection based on the direction information with reference to a front side of the operation unit 140. Accordingly, it is possible to prevent wireless connection with the terminal device 200 positioned at an inappropriate position. The terminal device 200 positioned at an inappropriate position is, for example, a terminal device 200 whose user and the terminal device 200 per se are positioned in a direction opposite to the operation unit 140. This is because it is not usually assumed that a user who desires to wirelessly connect the electronic device 100 and the terminal device 200 is positioned in the direction opposite to the operation unit 140.

Figure 4:
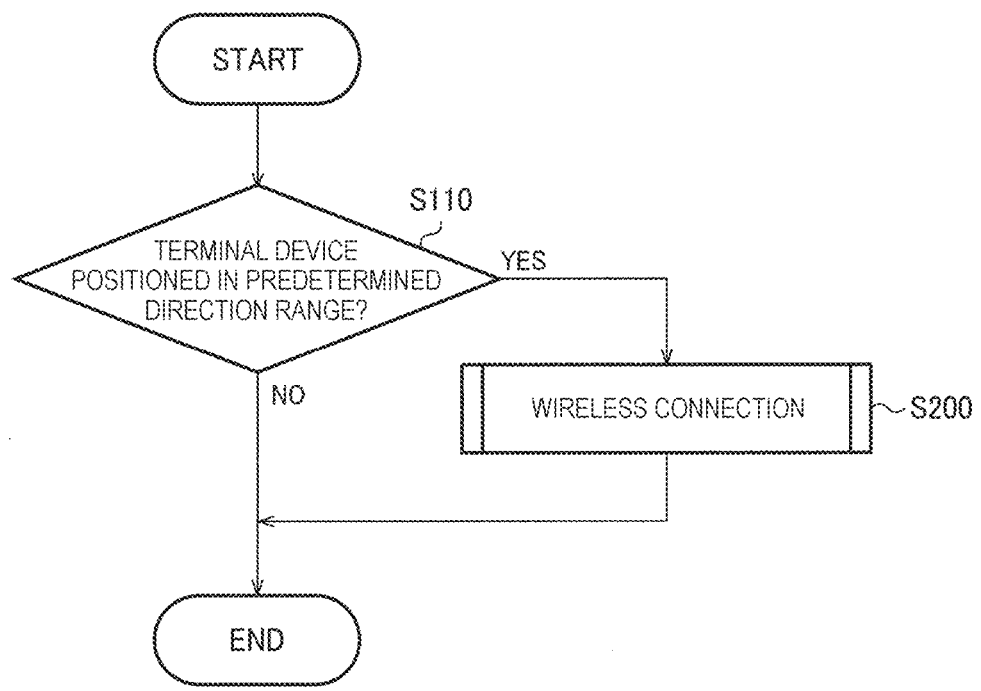
FIG. 4 is a flowchart showing a processing example of a method according to the embodiment.

As a processing example of the electronic device 100 according to the method of the embodiment, a flowchart of FIG. 4 may be used. The processing unit 130 performs processing of determining whether the terminal device 200 is positioned in the predetermined direction range (step S110). For example, the processing unit 130 determines whether the direction based on the direction information acquired by the direction information acquisition unit 120 is within a direction range of the predetermined angle α from the above-described reference position. When the processing unit 130 determines that the terminal device 200 is positioned in the predetermined direction range (YES in step S110), the processing unit 130 performs wireless connection (step S200) to be described later, and ends the flow. On the other hand, when the processing unit 130 determines that the terminal device 200 is not positioned in the predetermined direction range (NO in step S110), the processing unit 130 ends the flow.

When the electronic device 100 is a device which performs image formation, such as a printer or a scanner, by performing the wireless connection (step S200), the terminal device 200 can be operated, for example, to transmit image forming job data to the electronic device 100, and to transmit a command to execute the image formation based on the image forming job data. That is, in the electronic device 100 according to the embodiment, the wireless connection performed by the processing unit 130 may be for executing the image formation. In this way, the user can set the wireless connection appropriate for performing the image formation. For example, when a volume of the image forming job data is large, it may be difficult to transmit the image forming job data from the terminal device 200 to the electronic device 100 by wireless communication conforming to the BLE standard. In this regard, by applying the method according to the embodiment, it is possible to perform wireless communication connection conforming to, for example, the Wi-Fi standard, and thus it is possible to transmit the image job data by an appropriate wireless communication unit.

Although illustration of a flow is omitted, the processing unit 130 may further perform processing of excluding the terminal device 200 in which the connection application is not installed from a target of step S110. For example, when a connection application is installed in the terminal device 200, an advertising packet of BLE broadcasted by the BLE communication unit 212 includes identification information for identifying service of the connection application. For example, the processing unit 130 of the electronic device 100 performs processing of determining whether the identification information is in the advertising packet of BLE obtained by a scan. When the terminal device 200 is positioned in the predetermined direction range and the identification information is in the advertising packet of BLE broadcasted by the BLE communication unit 212 of the terminal device 200, the processing unit 130 determines YES in step S110 and performs the wireless connection (step S200). In other words, even if the terminal device 200 is positioned in the predetermined direction range, when the identification information is not in the advertising packet of BLE broadcasted by the BLE communication unit 212 of the terminal device 200, the processing unit 130 determines NO in step S110. As described above, in the electronic device 100 according to the embodiment, the processing unit 130 performs the processing of determining whether the beacon signal is a beacon signal for performing the wireless connection based on information in the beacon signal. In this way, the electronic device 100 can appropriately determine whether the terminal device 200 is a terminal device 200 of a user having an intention of making wireless connection with the electronic device 100 itself. Accordingly, it is possible to appropriately specify the terminal device 200 of the user having the intention of making the wireless connection.

Figure 5:
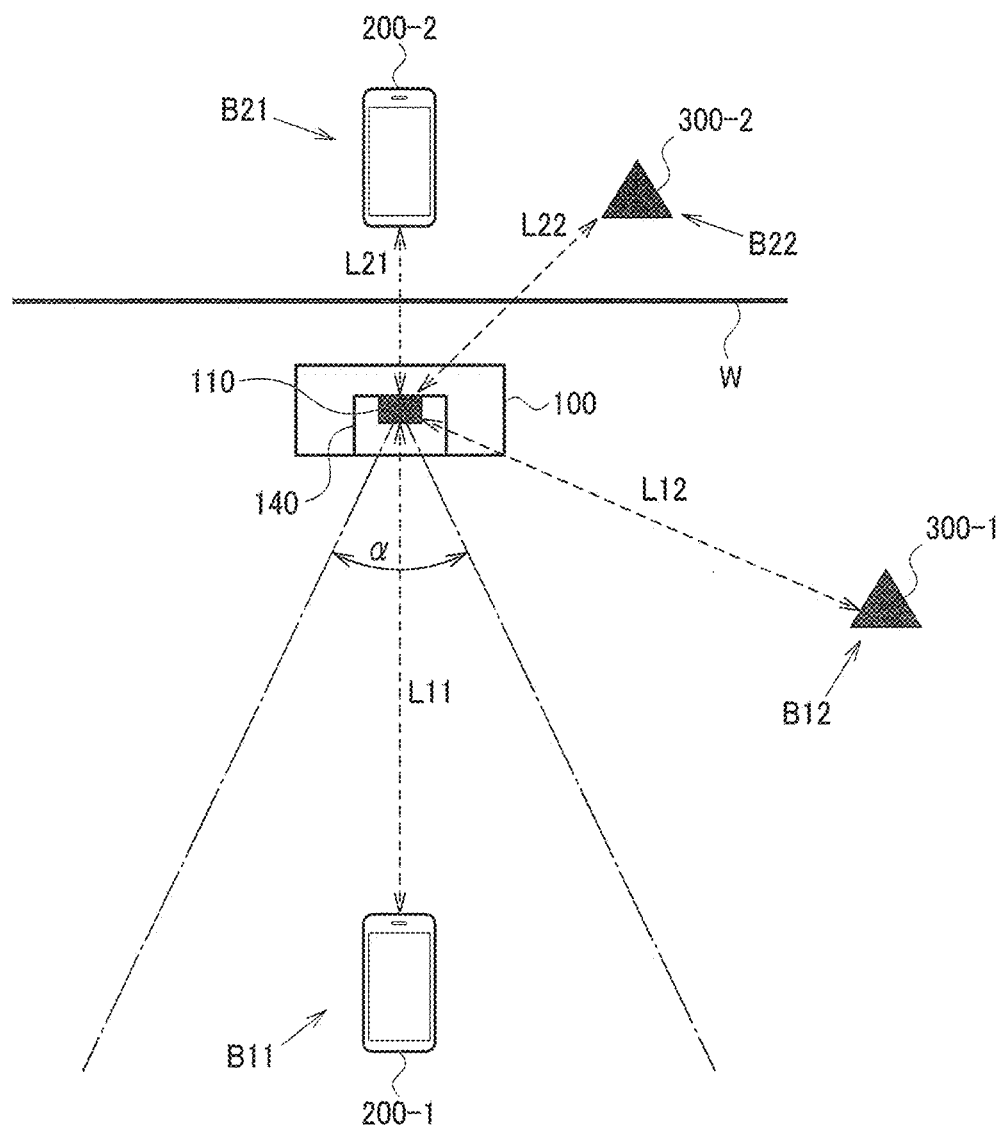
FIG. 5 is a diagram showing an example of a situation that can be relieved by the method according to the embodiment.

In a related-art method, the electronic device 100 cannot appropriately specify the terminal device 200 to be wirelessly connected to the electronic device 100 itself. For example, as shown in FIG. 5, it is assumed that a situation in which a user of a terminal device 200-1 desires wireless connection to the electronic device 100 and a situation in which a user of a terminal device 200-2 desires wireless connection to another electronic device 100 (not shown in FIG. 5) occur at the same timing. It is assumed that the terminal device 200-1 is positioned at a position indicated by B11, and the user of the terminal device 200-1 desires wireless connection to the electronic device 100 in the infrastructure mode via an external access point 300-1 positioned at a position indicated by B12. It is assumed that the terminal device 200-2 is positioned at a position indicated by B21, and the user of the terminal device 200-2 attempts to connect to the other electronic device 100 via an external access point 300-2 positioned at a position indicated by B22. It is assumed that the terminal device 200-1 is away from the reference position of the electronic device 100 by a distance L11, the external access point 300-1 is away from the reference position of the electronic device 100 by a distance L12, the terminal device 200-2 is away from the reference position of the electronic device 100 by a distance L21, and the external access point 300-2 is away from the reference position of the electronic device 100 by a distance L22. It is assumed that the user of the terminal device 200-2 cannot see the electronic device 100 shown in FIG. 5 due to a wall W.

In the related art, in order for the electronic device 100 to make a notification of existence of the electronic device 100 itself, a method for broadcasting a wireless communication radio wave according to a standard of first wireless communication such as BLE is known. However, in the above situation, a situation may occur in which both the terminal device 200-1 and the terminal device 200-2 find the same electronic device 100 by a scan and establish connection by the first wireless communication. Accordingly, for example, the user of the terminal device 200-2 may transmit connection information of the external access point 300-2 to the electronic device 100 by the first wireless communication, and as a result, the electronic device 100 may perform processing of connecting to the terminal device 200-2 in the infrastructure mode of the second wireless communication such as Wi-Fi. This is against an intention of the user of the terminal device 200-2.

A method for distinguishing the terminal devices 200 using information on an intensity of a radio wave in BLE may be considered, but the method is not an appropriate method because, for example, as shown in FIG. 5, the distance L21 may be shorter than the distance L11, and the distance L22 may be shorter than the distance L12. The information on the intensity of the radio wave will be described later.

In this regard, by applying the method according to the embodiment, the processing unit 130 can specify the terminal device 200-1 positioned at the position indicated by B11, which is the predetermined direction range, as the terminal device 200 which is requested to establish the wireless connection with the electronic device 100. For example, since the terminal device 200-2 in FIG. 5 is not positioned in the predetermined direction range including the predetermined angle α, the processing unit 130 performs processing of refusing the connection request from the terminal device 200-2 when the connection request is performed by the first wireless communication. On the other hand, since the terminal device 200-1 is positioned in the predetermined direction range, the processing unit 130 performs processing of establishing connection by the first wireless communication based on the connection request from the terminal device 200-1. Accordingly, the terminal device 200 of the user who desires connection to the electronic device 100 is appropriately specified, and the electronic device 100 performs the wireless connection with the terminal device 200, so that it is possible to improve the convenience of the electronic device 100.

Figure 6:
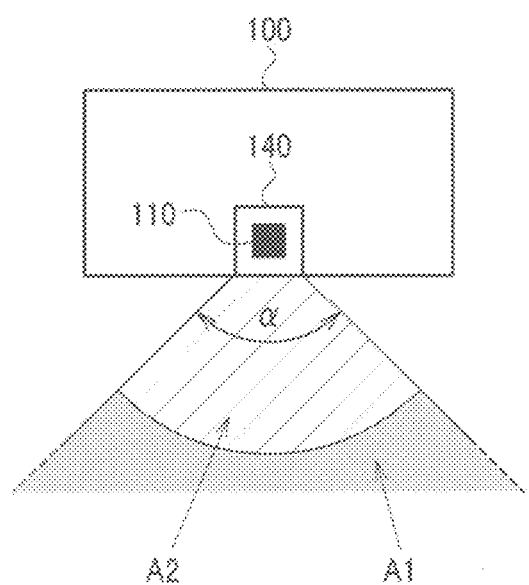
FIG. 6 is another diagram showing the predetermined direction range.

Although the processing example using the predetermined direction range or the like based on the direction information is described above, the method according to the embodiment is not limited thereto, and a processing example in which the distance information is further considered may be used. For example, as indicated by A2 in FIG. 6, a direction range indicated by A1 in FIG. 3 and a range of a predetermined distance from the reference position may be set as the predetermined direction range. The processing unit 130 can acquire distance information by, for example, the following method and set the distance information as the predetermined direction range. When the BLE communication unit 112 of the wireless communication unit 110 receives a radio wave based on BLE, the advertising packet of BLE includes reference intensity information on the radio wave, and thus the processing unit 130 can acquire information on a distance between the terminal device 200 and the electronic device 100. A reference intensity of the radio wave is a received signal strength indication (RSSI) of a beacon signal at a reception side device when the reception side device is disposed at a position away from a transmission side device for the beacon signal by a reference distance. Since an intensity of the radio wave is inversely proportional to a square of the distance, if the intensity of the radio wave at the reference distance is understood, the processing unit 130 can calculate, based on the intensity of the radio wave of a beacon signal of BLE actually received by the BLE communication unit 112, information related to the distance between the terminal device 200 and the electronic device 100 and the like. Information and the like related to the distance between the terminal device 200 and the electronic device 100 is a specific distance, such as "1.5 m", but may also be information which can differentiate between the predetermined direction range and a range other than the predetermined direction range. As described above, in the electronic device 100 according to the embodiment, the processing unit 130 performs the wireless connection when the terminal device 200 is positioned in the predetermined direction range and a predetermined distance range which is a range of a predetermined distance. In this way, the predetermined direction range can be set to a more appropriate range. Accordingly, it is possible to more appropriately select the terminal device 200 of a user who desires connection to the electronic device 100. For example, the terminal device 200 positioned at a position far from the reference position in the range of A1 described above is likely to be the terminal device 200 of a user who is accidentally positioned in the range of A1 but does not actually desire connection to the electronic device 100. In this regard, by applying the method according to the embodiment, the processing unit 130 can exclude the terminal device 200 from a target of the wireless connection, and thus it is possible to prevent unrequired wireless connection from being performed.

Figure 7:
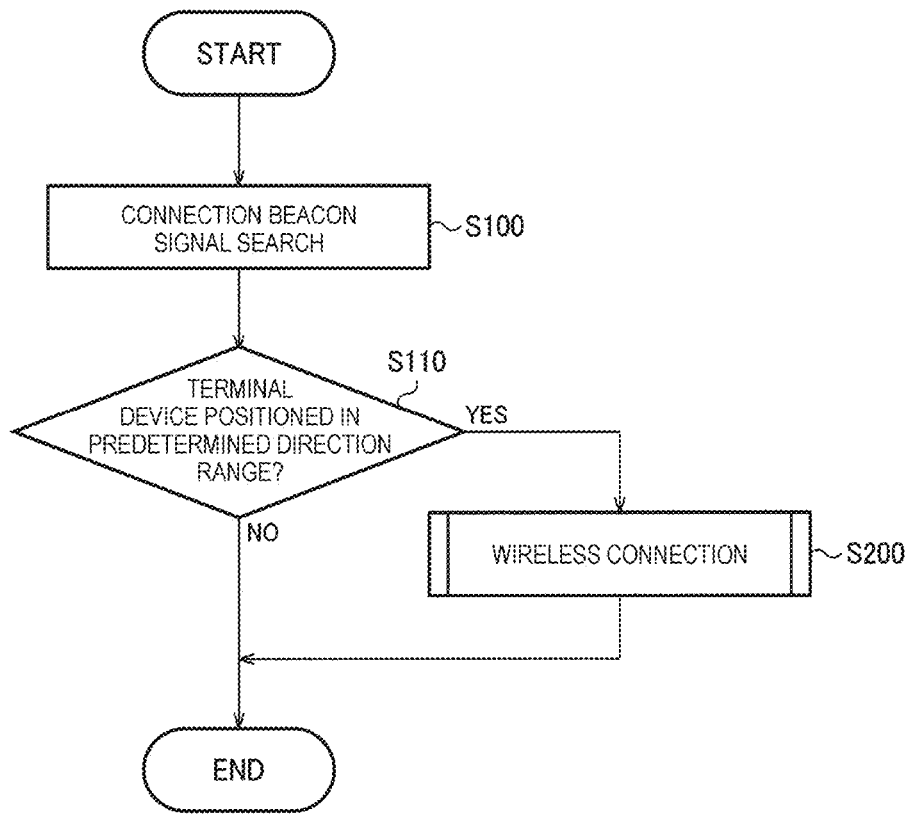
FIG. 7 is a flowchart showing another processing example according to the embodiment.

The processing example of the electronic device 100 according to the embodiment is not limited to FIG. 4, and a modification such as addition of other processing may be performed, and for example, a processing example shown in a flowchart of FIG. 7 may be used. After the electronic device 100 is powered on, the processing unit 130 performs connection beacon signal search (step S100). For example, after the electronic device 100 is powered on, the processing unit 130 performs, via the BLE communication unit 112, a scan for a beacon signal of BLE broadcasted by the terminal device 200. In other words, the processing unit 130 does not perform processing of broadcasting a beacon signal of BLE for indicating existence of the electronic device 100. The beacon signal of BLE here may include information indicating that the above-described connection application is installed in the terminal device 200. As described above, in the electronic device 100 according to the embodiment, the processing unit 130 performs processing of starting search for the beacon signal for the wireless connection after the electronic device 100 is powered on. In this way, it is possible to smoothly perform specification and wireless connection of the terminal device 200 to be connected. For example, when the beacon signal of BLE is broadcast from an electronic device 100, existence of the electronic device 100 itself is transmitted to the terminal device 200 which does not require connection to the electronic device 100, and the user of the terminal device 200 may misunderstand and make an unrequired connection request. In this regard, by applying the method according to the embodiment, it is possible to prevent, by searching for the terminal device 200 to be connected from the electronic device 100, a situation in which the electronic device 100 is connected to a terminal device 200 irrelevant to the connection. Accordingly, the specification and connection of the terminal device 200 to be connected can be smoothly performed. The processing unit 130 performs the processing of step S110 and subsequent steps in a similar manner as in FIG. 4. Although the processing example of FIG. 7 is a timer interrupt, it may be a loop in which step S100 is performed again after step S110 or step S200 is performed.

Figure 8:
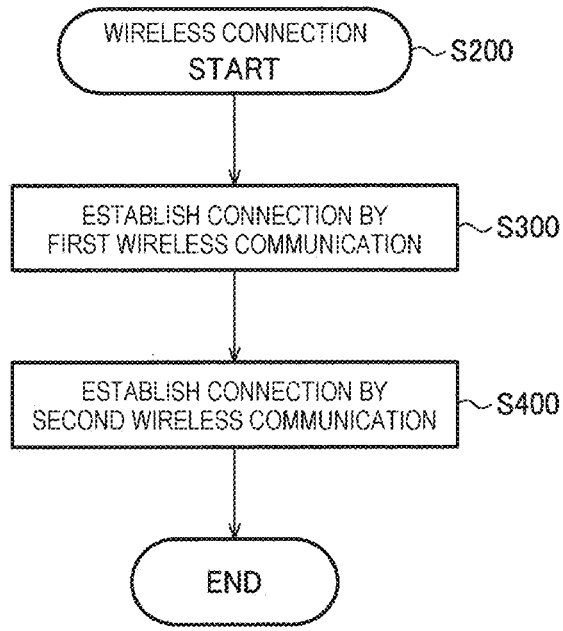
FIG. 8 is a flowchart showing a processing example of wireless connection.

Next, a processing example of the wireless connection (step S200) will be described in detail with reference to FIG. 8. First, the processing unit 130 performs processing of establishing connection by the first wireless communication (step S300). For example, when a standard of the first wireless communication is the BLE standard as described above, the processing unit 130 performs processing of pairing the BLE communication unit 112 of the electronic device 100 and the BLE communication unit 212 of the terminal device 200. That is, in the electronic device 100 according to the embodiment, the processing unit 130 performs the wireless connection by first wireless communication with the terminal device 200 which is proximity wireless communication when the processing unit 130 determines that the terminal device 200 is positioned in the predetermined direction range. In this way, the user can perform wireless communication by the first wireless communication between the desired electronic device 100 and the terminal device 200.

Thereafter, the processing unit 130 performs processing of establishing connection by the second wireless communication (step S400). For example, the processing unit 130 performs transmission and reception of data required for second wireless communication connection by the first wireless communication established in step S300. A specific method for transmitting and receiving data required for the second wireless communication connection differs depending on a connection mode of the second wireless communication, and will be described later with reference to FIGS. 9 and 10. For example, the user can select a connection mode on a screen of the connection application of the terminal device 200, and processing corresponding to the selected connection mode is performed. As described above, in the electronic device 100 according to the embodiment, the processing unit 130 performs connection for the second wireless communication based on connection information acquired by the first wireless communication. In this way, the user can perform the second wireless communication in a desired connection mode.

When the user of the terminal device 200 determines that it is sufficient to transmit and receive data by the first wireless communication, step S400 may be omitted. For example, although illustration is omitted, on the screen of the connection application of the terminal device 200, after the first wireless communication with the electronic device 100 is established, a display for requesting a determination as to whether to perform wireless connection with the electronic device 100 by the second wireless communication is shown. The user may select not to perform the wireless connection with the electronic device 100 by the second wireless communication, and end the connection application.

Figure 9:
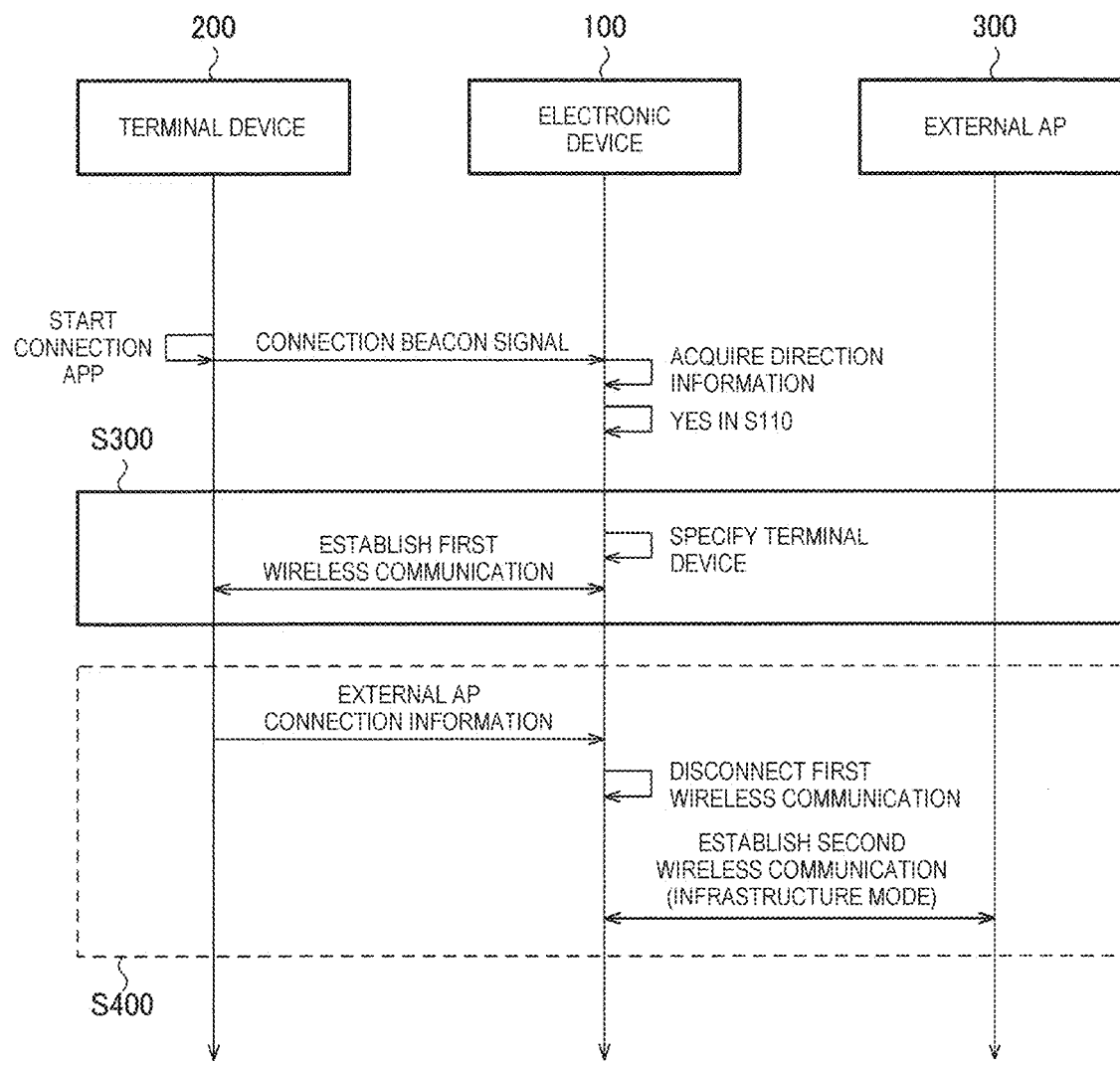
FIG. 9 is a diagram showing a detailed processing flow of the wireless connection.

With reference to FIG. 9, a flow of specific processing of steps S300 and S400 when the user selects the infrastructure mode as the connection mode of the second wireless communication will be described. When the user of the terminal device 200 starts the connection application, the BLE communication unit 212 of the terminal device 200 broadcasts a connection beacon signal conforming to the BLE standard. The direction information acquisition unit 120 of the electronic device 100 acquires direction information based on the connection beacon signal via the BLE communication unit 112. When the processing unit 130 determines that the terminal device 200 is positioned in the predetermined direction range based on the direction information acquired by the direction information acquisition unit 120 (YES in step S110), the processing unit 130 performs processing of specifying the terminal device 200 which broadcasted the connection beacon signal. The processing unit 130 performs pairing with the specified terminal device 200, and performs processing of establishing connection by the first wireless communication. That is, the processing of specifying the terminal device 200 described above and the processing of establishing the first wireless communication by the pairing correspond to step S300 in FIG. 8.

Thereafter, the BLE communication unit 212 of the terminal device 200 transmits external access point connection information for connecting to the external access point 300 to the BLE communication unit 112 of the electronic device 100. The external access point connection information is, for example, an SSID and a password of the external access point 300. The processing unit 130 performs processing of receiving the external access point connection information via the BLE communication unit 112 and processing of disconnecting the first wireless communication, and then performs processing of connecting to the external access point 300 using the external access point connection information. Accordingly, since the electronic device 100 also belongs to a network of the external access point 300 to which the terminal device 200 belongs, connection in the infrastructure mode is established between the electronic device 100 and the terminal device 200. Accordingly, the electronic device 100 establishes connection with the terminal device 200 by the second wireless communication, and can perform handover from the first wireless communication to the infrastructure mode of the second wireless communication. That is, the processing of transmitting and receiving the external access point connection information, the processing of disconnecting the first wireless communication, and the processing of establishing the connection between the electronic device 100 and the external access point 300 correspond to step S400 in FIG. 8.

Figure 10:
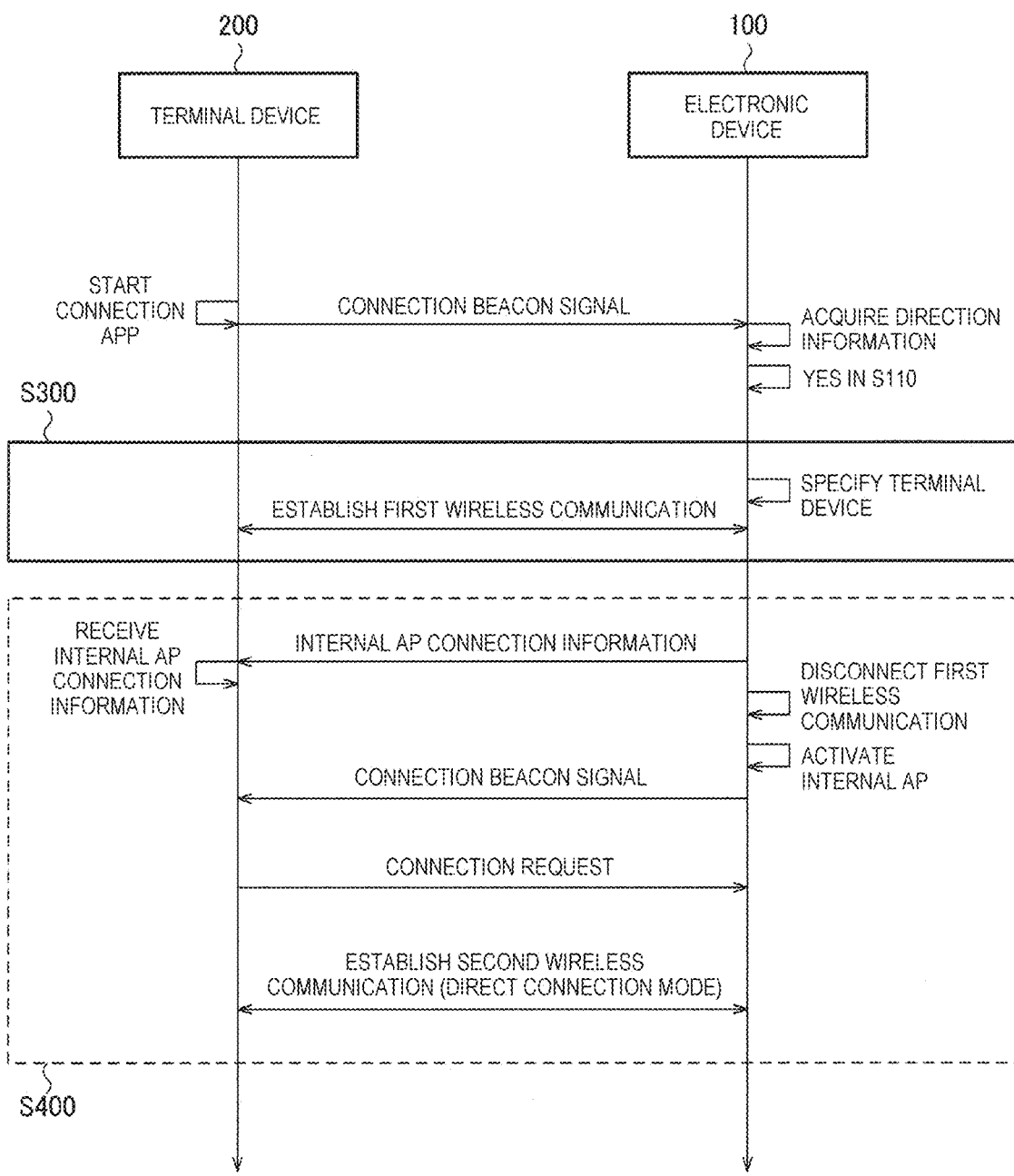
FIG. 10 is another diagram showing a detailed processing flow of the wireless connection.

With reference to FIG. 10, a flow of processing of steps S300 and S400 when the user selects the direct connection mode as the connection mode of the second wireless communication will be described. The steps from the step in which the user of the terminal device 200 starts the connection application to the step in which pairing using BLE is performed between the electronic device 100 and the terminal device 200 are similar as those in FIG. 9.

The processing unit 130 transmits internal access point connection information for connecting to the internal access point 116 to the BLE communication unit 212 of the terminal device 200 via the BLE communication unit 112. The internal access point connection information is an SSID, a password, an encryption key, and the like of the internal access point 116. The BLE communication unit 212 of the terminal device 200 receives the internal access point connection information and returns a response packet (not shown) to the BLE communication unit 112. After performing processing of receiving the response packet (not shown), the processing unit 130 performs processing of disconnecting the first wireless communication and processing of activating the internal access point 116. The internal access point 116 broadcasts a connection beacon signal conforming to the direct connection standard. The Wi-Fi communication unit 214 of the terminal device 200 grasps existence of the electronic device 100 by a scan, and then makes a connection request to the internal access point 116 using the internal access point connection information. Accordingly, direct connection is established between the electronic device 100 and the terminal device 200. Accordingly, the electronic device 100 establishes connection with the terminal device 200 by the second wireless communication, and can perform handover from the first wireless communication to the direct connection mode of the second wireless communication. That is, the processing of transmitting and receiving the internal access point connection information, the processing of disconnecting the first wireless communication and activating the internal access point 116, and a series of processing of establishing direct connection correspond to step S400 in FIG. 8.

As described above, an electronic device according to the embodiment is an electronic device for wirelessly communicating with a terminal device by a wireless communication unit, and includes a direction information acquisition unit and a processing unit. The direction information acquisition unit acquires, based on a beacon signal received by the wireless communication unit from the terminal device, direction information related to a direction of the terminal device with respect to a reference position of the electronic device. The processing unit performs wireless connection of wirelessly connecting to the terminal device when the processing unit determines that, based on the direction information, the terminal device is positioned in a predetermined direction range.

In this way, since the wireless connection is performed when the terminal device is positioned in the predetermined direction range, it is possible to appropriately specify the terminal device to be wirelessly connected.

The processing unit may perform the wireless connection when the terminal device is positioned in the predetermined direction range and a predetermined distance range which is a range of a predetermined distance.

In this way, the predetermined direction range can be set to a more appropriate range.

The reference position may be a position of an operation unit, and the predetermined direction range may be a range including a front direction from the operation unit.

In this way, the processing unit can perform the wireless connection based on the direction information with reference to a front side of the operation unit.

The processing unit may perform the wireless connection by first wireless communication, which is proximity wireless communication, with the terminal device when the processing unit determines that the terminal device is positioned in the predetermined direction range.

In this way, the user can perform wireless communication by the first wireless communication between the desired electronic device and the terminal device.

The processing unit may perform connection for second wireless communication based on connection information acquired by the first wireless communication.

In this way, the user can perform the second wireless communication in a desired connection mode.

The first wireless communication may be wireless communication conforming to the Bluetooth standard, and the second wireless communication may be wireless communication conforming to the Wi-Fi standard.

In this way, it is possible to construct a wireless communication connection system conforming to the Wi-Fi standard by using wireless communication conforming to the Bluetooth standard.

The beacon signal based on which the direction information acquisition unit acquires the direction information may conform to the Bluetooth standard.

In this way, the direction information acquisition unit can acquire direction information based on the Bluetooth direction detection function.

The processing unit may perform processing of determining whether the beacon signal is a beacon signal for performing the wireless connection based on information in the beacon signal.

In this way, the electronic device can appropriately determine whether the terminal device is the terminal device of the user having an intention of making wireless connection with the electronic device itself.

The processing unit performs processing of starting search for the beacon signal for the wireless connection after the electronic device is powered on.

In this way, it is possible to smoothly perform specification and wireless connection of the terminal device to be connected.

The wireless connection performed by the processing unit may be for executing image formation.

In this way, the user can set the wireless connection appropriate for performing the image formation.

A processing method according to the embodiment includes: performing wireless communication of wirelessly communicating with a terminal device; performing processing of acquiring, based on a beacon signal received by the wireless communication, direction information related to a direction of the terminal device with respect to a reference position of an electronic device; and performing wireless connection of wirelessly connecting to the terminal device when a determination is made that, based on the direction information, the terminal device is positioned in a predetermined direction range.

A non-transitory computer-readable storage medium storing a program according to the embodiment includes: causing a computer to function as a wireless communication unit configured to wirelessly communicate with a terminal device, a direction information acquisition unit, and a processing unit. The direction information acquisition unit acquires, based on a beacon signal received by the wireless communication unit from the terminal device, direction information related to a direction of the terminal device with respect to a reference position of an electronic device. The processing unit performs wireless connection of wirelessly connecting to the terminal device when the processing unit determines that, based on the direction information, the terminal device is positioned in a predetermined direction range.

Although the embodiment is described in detail above, it will be easily understood by those skilled in the art that many modifications can be made without substantially departing from the novel matters and effects of the embodiment. Accordingly, such modifications are intended to be in the scope of the present disclosure. For example, a term cited with a different term having a broader meaning or the same meaning at least once in the description or in the drawings can be replaced with a different term at any place in the description or in the drawings. All combinations of the embodiment and the modifications are also in the scope of the present disclosure. Configurations, operations, and the like of the electronic device, the processing method, and the program are not limited to those described in the embodiment, and various modifications can be made.

What is claimed is:

1. An electronic device for wirelessly communicating with a terminal device by a wireless communicator, the electronic device comprising:
   a direction information acquisition unit configured to acquire, based on a beacon signal received by the wireless communicator from the terminal device, direction information related to a direction of the terminal device with respect to a reference position of the electronic device; and
   a processor configured to perform wireless connection of wirelessly connecting to the terminal device when the processor determines that, based on the direction information, the terminal device is positioned in a predetermined direction range, wherein
   the processor performs the wireless connection by first wireless communication, which is proximity wireless communication, with the terminal device when the processor determines that the terminal device is positioned in the predetermined direction range, and
   the processor performs connection for second wireless communication based on connection information acquired by the first wireless communication from the terminal device.

2. The electronic device according to claim 1, wherein the processor performs the wireless connection when the terminal device is positioned in the predetermined direction range and a predetermined distance range which is a range of a predetermined distance.

3. The electronic device according to claim 1, wherein the reference position is a position of an operator, and the predetermined direction range is a range including a front direction from the operator.

4. The electronic device according to claim 1, wherein the first wireless communication is wireless communication conforming to the Bluetooth standard, and the second wireless communication is wireless communication conforming to the Wi-Fi standard.

5. The electronic device according to claim 4, wherein the beacon signal based on which the direction information acquisition unit acquires the direction information conforms to the Bluetooth standard.

6. The electronic device according to claim 1, wherein the processor performs processing of determining whether the beacon signal is a beacon signal for performing the wireless connection based on information in the beacon signal.

7. The electronic device according to claim 1, wherein the processor performs processing of starting search for the beacon signal for the wireless connection after the electronic device is powered on.

8. The electronic device according to claim 1, wherein the wireless connection performed by the processor is for executing image formation.

9. A processing method comprising:
   performing wireless communication of wirelessly communicating with a terminal device;
   performing processing of acquiring, based on a beacon signal received by the wireless communication, direction information related to a direction of the terminal device with respect to a reference position of an electronic device; and
   performing wireless connection of wirelessly connecting to the terminal device when a determination is made that, based on the direction information, the terminal device is positioned in a predetermined direction range, wherein
   the wireless connection is performed by first wireless communication, which is proximity wireless communication, with the terminal device when it is determined that the terminal device is positioned in the predetermined direction range, and
   connection is performed for second wireless communication based on connection information acquired by the first wireless communication from the terminal device.

10. A non-transitory computer-readable storage medium storing a program, the program comprising:
    causing a computer to function as
    a wireless communicator configured to wirelessly communicate with a terminal device,
    a direction information acquisition unit configured to acquire, based on a beacon signal received by the wireless communicator from the terminal device, direction information related to a direction of the terminal device with respect to a reference position of an electronic device, and
    a processor configured to perform wireless connection of wirelessly connecting to the terminal device when the processor determines that, based on the direction information, the terminal device is positioned in a predetermined direction range, wherein
    the processor performs the wireless connection by first wireless communication, which is proximity wireless communication, with the terminal device when the processor determines that the terminal device is positioned in the predetermined direction range, and
    the processor performs connection for second wireless communication based on connection information acquired by the first wireless communication from the terminal device.

* * * * *